(12) United States Patent
Sigler et al.

(10) Patent No.: US 8,851,811 B2
(45) Date of Patent: Oct. 7, 2014

(54) STABILIZER FOR DRESSING ELECTRODES AND METHOD OF USING THE SAME

(75) Inventors: David R. Sigler, Shelby Township, MI (US); James G. Schroth, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1231 days.

(21) Appl. No.: 12/696,312

(22) Filed: Jan. 29, 2010

(65) Prior Publication Data

US 2011/0188952 A1 Aug. 4, 2011

(51) Int. Cl.
*B23B 5/00* (2006.01)
*B23B 5/36* (2006.01)
(52) U.S. Cl.
CPC .... *B23B 5/00* (2013.01); *B23B 5/36* (2013.01)
USPC .............................. 409/140; 409/138; 409/139

(58) Field of Classification Search
USPC .......................................... 409/140, 138, 139
See application file for complete search history.

(56) References Cited

U.S. PATENT DOCUMENTS

| | | | | |
|---|---|---|---|---|
| 4,966,506 A | * | 10/1990 | Slanker | 409/140 |
| 5,332,342 A | * | 7/1994 | Kizaki et al. | 409/140 |
| 6,182,543 B1 | * | 2/2001 | Ito et al. | 82/127 |
| 6,861,609 B2 | | 3/2005 | Sigler | |
| 6,974,933 B2 | | 12/2005 | Rice | |
| 8,226,338 B2 | * | 7/2012 | Tezawa et al. | 409/140 |

* cited by examiner

*Primary Examiner* — Andrea Wellington
*Assistant Examiner* — Mohammad Nourbakhsh
(74) *Attorney, Agent, or Firm* — BrooksGroup

(57) ABSTRACT

One embodiment includes an electrode dressing apparatus having a rotatable dressing blade including a first cutting face, an electrode comprising an electrode body and a weld face, and an electrode guide positioned absolutely relative to the rotatable dressing blade to position the weld face of the electrode at a designated location over the first cutting face.

17 Claims, 3 Drawing Sheets

STABILIZER FOR DRESSING ELECTRODES AND METHOD OF USING THE SAME

TECHNICAL FIELD

The field to which the disclosure generally relates includes welding electrode dressers and methods of dressing electrodes.

BACKGROUND

Manufacturing operations often require the formation of electrical resistance welds. Electrical resistance welding (ERW), for example spot welding or seam welding, includes clamping the components of a work piece to be welded between a pair of opposed electrodes, and passing sufficient electrical current through the electrodes and components to melt and fuse the components together. Resistance spot welding (RSW) may be performed using a welding gun having copper alloy welding electrodes. One electrode may be fixed and the other electrode may be moveable with respect to the weld gun. The components to be welded may be, for example, two sheet metal panels.

Dressing of electrodes is a process to reshape or resurface electrodes when the electrodes become worn. Wear can be caused, for example, by reaction between the copper electrode and the metal sheet, which may comprise aluminum, steel, or zinc-coated steel. In the case of an aluminum sheet, aluminum may be transferred to the electrode as an oxide, metal particles, or alloyed with the copper. This transfer eventually leads to pits on the electrode surface that can be harmful to the welding process. In the case of zinc-coated steel, the copper electrode can react with zinc forming a soft brass alloy on the electrode weld face that accelerates electrode deformation. Wear can also be caused by simple deformation of the electrode from exposure to high temperatures and pressures, especially during the spot welding of steel.

Dressing of electrodes can accomplish different results depending on the design of both the electrode and the dressing blade, as well as the primary purpose for dressing. For example, heavy cutting of metal from the electrode sides, sometimes called the electrode form or shoulder, may be used primarily on deformed electrodes to maintain electrode geometry during spot welding of steel. Very little cutting would take place on the electrode weld face. Light cutting of the electrode weld face may be used to remove welding contamination and pits that have formed during the spot welding of aluminum alloys. In general, the dressing process for electrodes used in spot welding uses hardened blades that rotate at moderate speed to machine off portions of the electrode, i.e., the electrode sides, form, or shoulder, and the weld face.

SUMMARY OF EXEMPLARY EMBODIMENTS OF THE INVENTION

One embodiment includes an electrode dressing apparatus having a rotatable dressing blade including a first cutting face, an electrode comprising an electrode body and a weld face, and an electrode guide positioned absolutely relative to the rotatable dressing blade to position the weld face of the electrode at a designated location over the first cutting face.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

Various embodiments of the invention provide a product for dressing electrodes and a method of dressing electrodes. Dressing of electrodes may include cleaning and/or reshaping of electrodes. The surface condition of the electrode weld face may be especially important for electrodes used in aluminum resistance spot welding because the electrodes for aluminum welding suffer from weld face erosion caused by reaction of the copper electrode with the aluminum sheet. However, embodiments are not limited to use with a particular electrode material but may be used for dressing electrodes of a variety of compositions including, for example, electrodes including copper and copper alloys.

Figure 1:
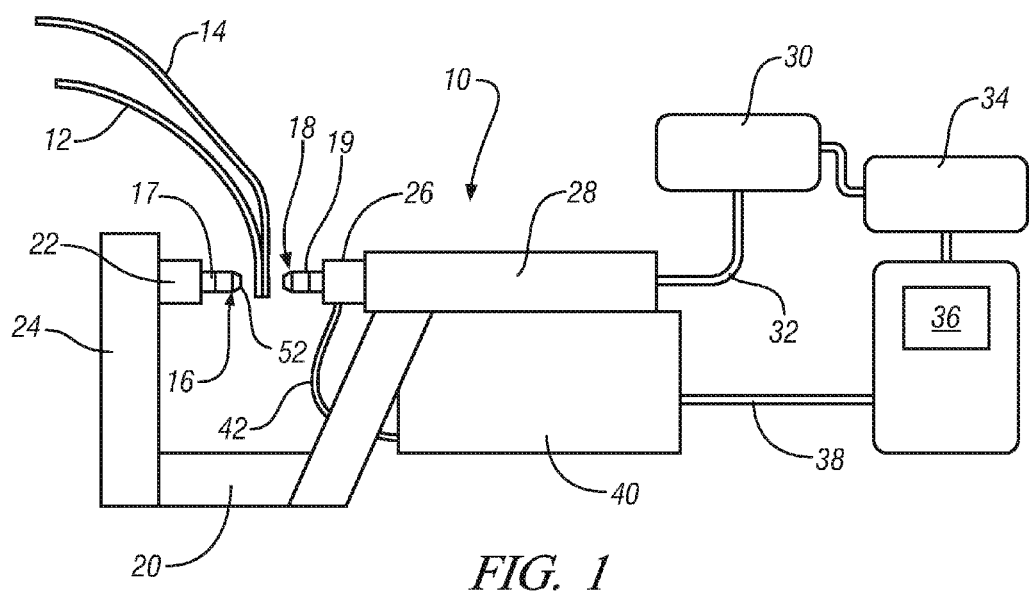
FIG. 1 shows a selection of a welding assembly according to one embodiment of the invention.

The electrodes may be located on a welding gun 10, as shown in FIG. 1. The welding gun 10 may be used to weld, for example, a first sheet 12 and a second sheet 14. In one embodiment, the sheets 12, 14 may be a variety of metals and alloys thereof such as steel, aluminum, or magnesium. In one embodiment, the sheets 12, 14 may be placed between substantially axially aligned and opposing first electrode 16 and second electrode 18. The first electrode 16 and the second electrode 18 may be positioned on a welding gun arm 20. In various embodiments, the welding gun 10 may be, but is not limited to, a "C" type welding gun (shown in FIG. 1) or an "X" (rocker) type welding gun (not shown). For a "C" type welding gun, the welding gun arm 20 may be in the form of a "C" so that the opposing electrodes 16, 18 can be brought to bear and press on opposite sides of the sheets 12, 14. In one embodiment, the first electrode 16 and the second electrode 18 may be resistance spot welding electrodes.

In one embodiment, the first electrode 16 may be mounted on a shank 17 which may be inserted in a holder 22 attached to a fixed arm 24 of welding gun arm 20. The second electrode 18 may be mounted on shank 19 and inserted in another holder 26 carried in an air cylinder 28. Air cylinder 28 may be adapted to axially move the second electrode 18 into clamping engagement with the outer surface of the second sheet 14. A source of high pressure air from a remote source, not shown, may deliver air through a programmable air regulator 30 through air line 32 to air cylinder 28. During a spot welding sequence, the timely application of air pressure to air cylinder 28 may advance holder 26 so that the second electrode 18 presses sheets 12 and 14 against the stationary first electrode 16 with a force, for example on the order of 500 to 1500 pounds. Clamping pressure on the welding electrodes 16, 18 may also be achieved by the use of a servo gun with servo motor and servo control (not shown).

The welding gun 10 shown in FIG. 1 may be stationary or it may be mounted on the end of a robot arm (not shown). In either arrangement, a spot weld controller may be associated with welding gun 10 to suitably execute a spot welding operation. For example, a robot/machine controller 34 may be programmed or used to initiate and control the movement of the robot or the actuation of the welding machine to engage or to receive the assembled sheet metal parts. Machine controller 34 may manage and actuate programmable air regulator 30 and a welding controller 36. Welding controller 36 may regulate the passage of the primary welding current. The welding energy source may be three phase, 60 Hz, high voltage, low current alternating current. Upon command of welding controller 36, the primary current may be delivered through primary current line 38 to a weld transformer 40. The weld transformer 40 may convert the primary current to a lower voltage, higher current, secondary welding current. The secondary welding current may be provided through secondary current line 42 and electrode holder 26 as well as conductive gun arm 20 and electrode holder 22. The welding current for welding aluminum may be on the order of 15,000 to 40,000 amperes depending upon the requirements of the welding operation. Where 60 cycle AC current is provided, the total welding time for a typical aluminum spot weld may be, for example, from 5-20 cycles of the 60 hertz current. The welding current for steel may be lower, and the welding time for steel may be much longer than for aluminum.

In one embodiment, the welding of the two sheets 12, 14 may require many spot welds around the perimeter of the panels or at such other suitable locations as may be desired. Machine controller 34 manages the overall motion of the electrodes (through programmable air regulator 30) and the passage and timing of the welding current through weld controller 36. Each cycle comprises closing the electrodes 16, 18 on an interposed assembly to be welded, applying a suitable clamping force by the electrodes 16, 18 to press the layers of sheet metal together, passing an impulse of welding current through the pieces to form a weld nugget of suitable size between them, opening the electrodes 16, 18 and removing or repositioning the workpiece for another weld.

Figure 2:
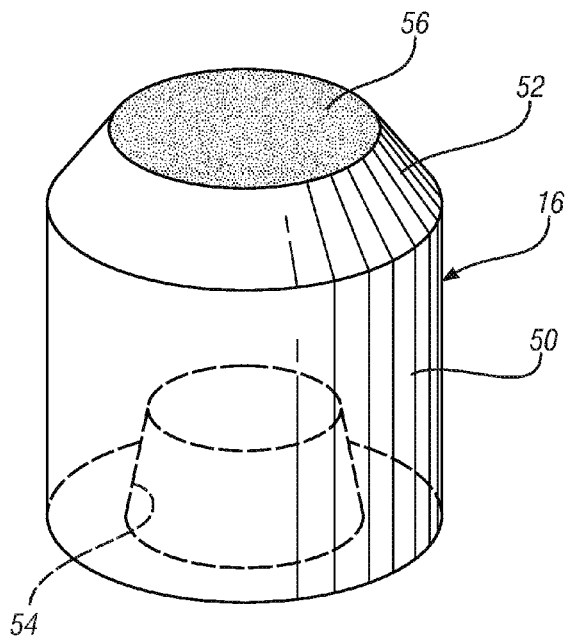
FIG. 2 shows an electrode according to one embodiment of the invention.

In one embodiment, the electrodes 16, 18 may be copper alloy electrodes. The first electrode 16 is shown in FIG. 2. The second electrode 18 may be identical or substantially identical to the first electrode 16. Referring again to FIG. 2, the first electrode 16 may have an elongated body 50 having a circular cross-section and a truncated conical or truncated spherical end composed of a shoulder or form 52 which may be tapered and a weld face 56. The body 50 may have a hollow receptacle 54 adapted to receive a shank 17 for insertion in holder 22, or the like, of a welding gun. The hollow receptacle 54 may further be shaped to allow internal water cooling with water passing through the shank 17. The welding surface or weld face 56 may be designed to contact the sheets 12, 14. The welding surface 56 may take any suitable configuration. In one embodiment, the welding surface 56 may be generally flat. In another embodiment, the welding surface 56 may be radiused. In another embodiment, the welding surface 56 may be textured.

Figure 3:
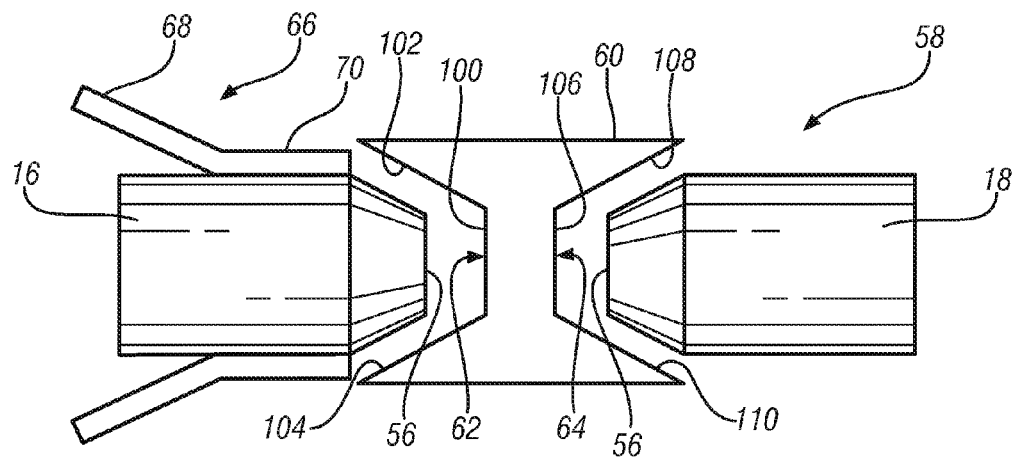
FIG. 3 shows a dressing apparatus including a dressing blade and an electrode guide according to one embodiment of the invention.

Referring to FIG. 3, one embodiment includes a product 58. The product 58 may comprise a dressing apparatus for dressing the electrodes 16, 18 while the electrodes 16, 18 are mounted in shanks 17, 19 respective of the welding gun 10. The product 58 may include a rotatable electrode dressing blade 60. The rotatable electrode dressing blade 60 may have a first cutting face 62 and a second cutting face 64. The first cutting face 62 may include a first portion 100 designed to cut a flat surface, and second and third portions 102, 104 respectively designed to cut tapered surfaces. Similarly, the second cutting face 64 may include a first portion 106 designed to cut a flat surface, and second and third portions 108, 110 respectively designed to cut tapered surfaces.

Each cutting face 62, 64 may comprise one or more cutting blades. The product 58 may also include an electrode guide 66. In one embodiment, the electrode guide 66 may be rigidly secured to the dressing apparatus itself. The electrode guide 66 may be positioned to connect with an electrode 16 which may be stationary. In another embodiment, the electrode guide 66 may be rigidly secured to a support such as a stand for the dressing apparatus.

In one embodiment, the electrode guide 66 may include a tapered guide portion 68 and a straight guide portion 70. The tapered guide portion 68 may assist the insertion of the electrode 16 into the electrode guide 66 during the dressing operation. The electrode guide 66 may fix the relative radial position of the first electrode 16, with respect to the axis of rotation of the dressing blade 60, as the dressing blade 60 is brought into contact with the electrode 16. The straight guide portion 70 may be in close proximity to the dressing blade 60 as the dressing blade 60 is brought into contact with the first electrode 16.

In one embodiment, the electrode guide 66 may fully surround the first electrode 16. That is, the straight guide portion 70 may be tubular with straight sides and have a circular cross section. The tapered guide portion 68 may comprise a frustoconical portion extending from the straight guide portion 70. In another embodiment, the electrode guide 66 may be in separate pieces and may interact with portions of the first electrode 16. The separate pieces may be obtained by sectioning tubular electrode guide 66 in the transverse or longitudinal direction. For example, this may be accomplished if the guide was composed of a series of bent wires with gaps in between them that extended the length of the guide.

In one embodiment, the electrode guide 66 causes the first electrode 16, and consequently the remainder of the welding apparatus, to be located at a well-defined position relative to the dressing blade 60. Then the second electrode 18 is brought to the dressing blade 60 by operation of the weld gun mechanism and the electrodes are dressed by cutting both the weld face 56 and shoulder 52. The resulting weld faces 56 will be very well aligned with each other, even though the central axis of each of the electrodes 16, 18 may be slightly misaligned with respect to each other.

In one embodiment, the electrode guide 66 may include a surface covering of a low friction coating or other layer (not shown) to more readily bring the dressing blade 60 and electrode 16 into alignment as they are brought together.

In one embodiment, the dressing blade 60 may be located in a holder (not shown) in a dressing machine (not shown).

In one embodiment, the electrode guide 66 may stabilize and align the electrodes 16, 18 relative to the electrode dressing blade 60. The electrode guide 66 may aid in the reduction of relative motion or chattering between the electrode surfaces and the cutting faces 62, 64 to improve the geometry and finish of the weld faces of the electrodes 16, 18. Chattering is particularly common when the electrode to be dressed is not well supported through contact of the shoulder region of the electrode surface and matching region of dressing blade. This can occur for various reasons. The shoulder will not hold the electrode securely if the shoulder angle is too shallow, for example less than ~45 degrees, or the shoulder length is too short. This will allow the electrode to move or chatter within the dressing blade 60. If the dressing blade cutting angles produce greater metal removal from the shoulder or form area compared to the weld face, then this will create a gap between the blade and electrode allowing it to move or chatter.

Figure 4:
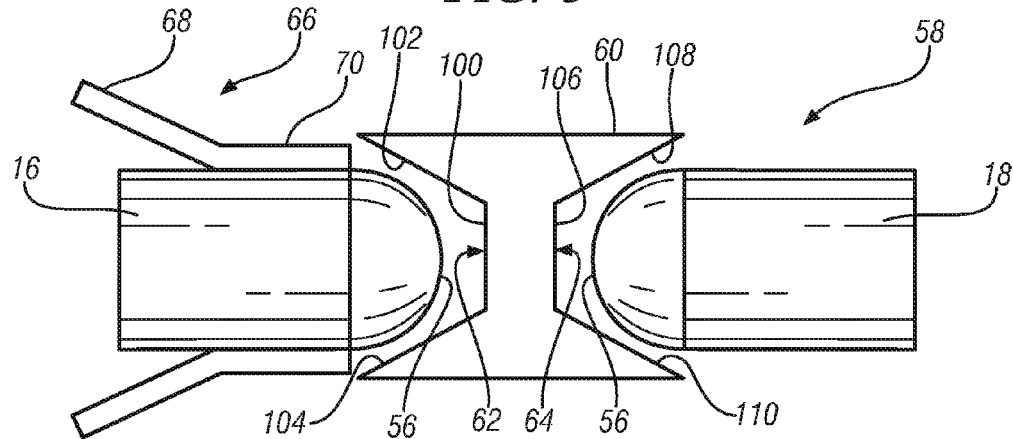
FIG. 4 shows a dressing apparatus and a round ball-nosed electrode according to one embodiment of the invention.

Finally, if the electrode shape does not match its final dressed shape, it may move or chatter. For example, when an electrode with a face diameter smaller than that of the dressing blade, such as a round ball-nose electrode, is dressed using a blade to produce an electrode with a much larger weld face, movement or chattering becomes excessive. FIG. 4 shows first and second round ball-nosed electrodes 17 and 19 to be dressed with the dressing blade 60.

Figure 5:
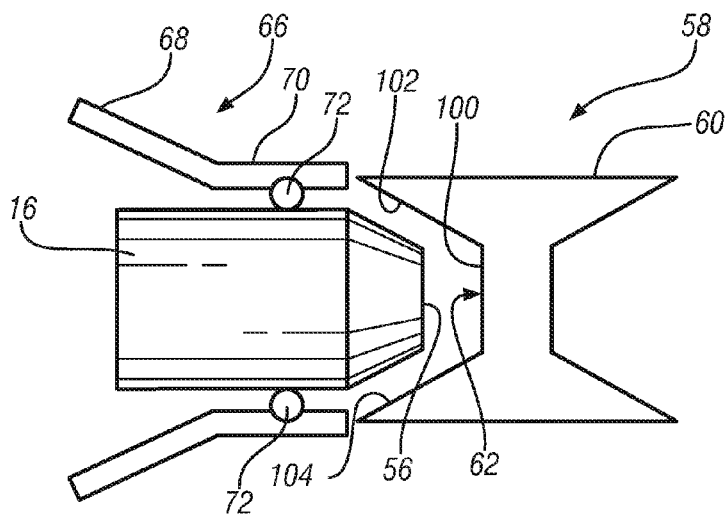
FIG. 5 shows a dressing apparatus, electrode guide, and bearings according to one embodiment of the invention.

Referring to FIG. 5, in one embodiment the straight guide portion 70 of the electrode guide 66 may include bearings 72. The bearings 72 may assist in movement of the electrode 16 within the electrode guide 66. In various embodiments, the bearings 72 may be ball bearings or roller bearings. In one embodiment, the bearings 72 may be spring loaded such that the electrode guide 66 is held tightly in the vertical direction while still allowing easy movement of the electrode in the lateral direction.

In one embodiment, a method is provided to prevent relative lateral motion between the electrodes 16, 18 and the dressing blade 60 during the dressing process. The method may improve the formation of proper electrode geometry for welding. In this embodiment, the central axes of the electrodes 16 and 18 may be slightly offset with respect to each other before the dressing operation, and will remain slightly offset during and after the dressing operation. The method may ensure that even when the electrodes 16, 18 are slightly misaligned with respect to each other, the final machined faces 56 of the two electrodes are aligned with the dressing blade 60 in a controlled and reproducible manner, and the midpoints of the final machined faces 56 are aligned with each other.

In one embodiment, the method includes providing the electrode dressing blade 60 including the first blade face 62 and the second blade face 64. The electrode guide 66 including the straight guide portion 70 and the tapered guide portion 68 may be secured in close proximity to the electrode dressing blade 60. The electrode guide 66 may be in direct contact with the electrode dressing apparatus. In one embodiment, the electrode guide 66 may be used to guide only one electrode. For example, the electrode guide 66 may be applied to the first electrode 16.

Using the electrode guide 66, the first electrode 16 may be positioned with respect to the first blade face 62. The second electrode 18 may be moveable, but the second electrode 18 approaches the dressing blade along a well-controlled path. Movement of the second electrode 18 urges the first blade face 62 to contact the first electrode 16 and urges the second blade face 64 to contact the second electrode 18. The electrode dressing blade 60, which is rotating prior to contact with the electrodes, may machine off portions of the electrodes 16, 18. The result is that the final machined faces 56 of the electrodes 16, 18 are aligned with the dressing blade 60 and with each other in a controlled and reproducible manner, and the midpoints of the final machined weld faces 56 are aligned with each other. But the central axes of the electrodes 16, 18 may be slightly misaligned with respect to each other.

In one embodiment, the weld gun 10 may be suspended from a robot (not shown) and the dressing machine may be suspended by springs (not shown). This arrangement may be prone to greater misalignment between the two opposing electrodes 16, 18. By guiding the first electrode 16 to be fully aligned with the dressing blade 60, use of the electrode guide 66 to set the absolute position of the weld gun by defining the radial position of the first electrode 16 will ensure that the face of the second electrode 18 will be aligned with the face of the first electrode 16 despite the occurrence of some misalignment between the central axes of the electrodes 16, 18.

The use of the electrode guide 66 on, for example, the stationary first electrode 16 enables the first and second electrodes 16, 18 to have machined faces that are aligned with the dressing blade 60 in a consistent and reproducible manner.

In one embodiment, the electrodes 16, 18 are positioned on the weld gun 10 and then brought into contact with the electrode dressing blade 60. In one embodiment, both electrodes 16, 18 on the weld gun 10 are brought into contact with the rotating dressing blade 60 simultaneously by closing the weld gun at low force, for example between about 200 to about 400 lbs, with the electrodes 16, 18 centered over the rotating blade 60. Using the guide 66, the weld gun 10 is positioned such that the first electrode 16 contacts the first blade face 62 and the second electrode 18 contacts the second blade face 64. The rotating electrode dressing blade 60 then machines off portions of the first electrode 16 and the second electrode 18.

Figure 6:
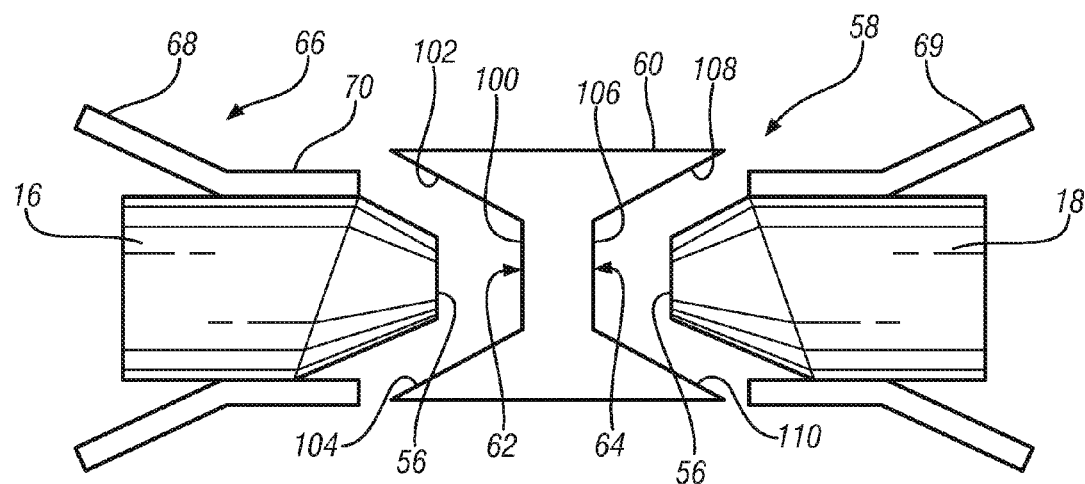
FIG. 6 shows a dressing apparatus including a dressing blade and two electrode guides according to one embodiment of the invention.

In another embodiment, the guide 68 and a second guide 69 may be used to align the electrodes 16, 18 such that the weld faces 56 are both machined off-center with respect to the central axis of the respective electrodes, but the weld faces 56 are in alignment with each other. As shown in FIG. 6, the two guides 68, 69 would deliberately force the electrodes 16, 18 to a position where both of the weld faces 56 would be machined off-center. This arrangement would put large side loads on the electrodes 16, 18 during the dressing operation. This arrangement would require that the guides 68, 69 be mounted securely relative to the dressing blade position.

Figure 7:
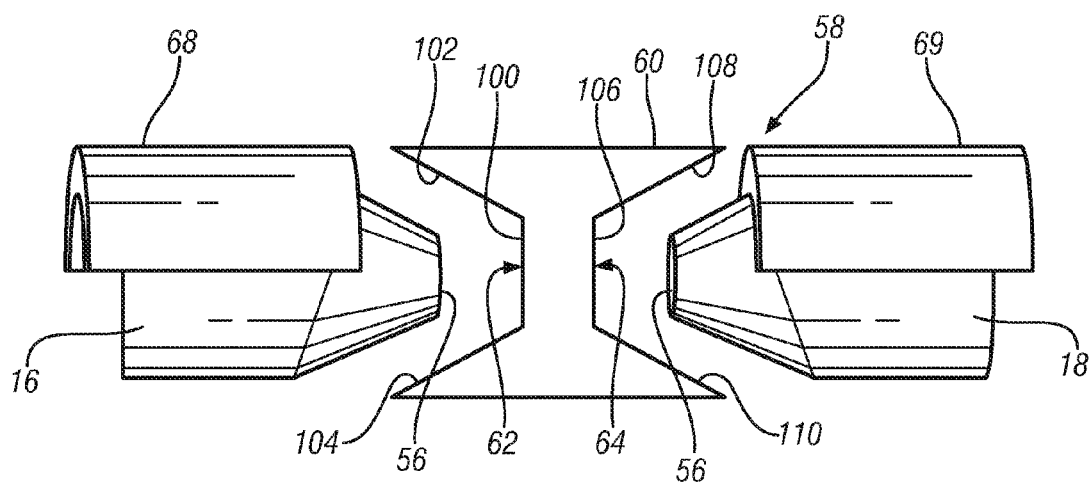
FIG. 7 shows a dressing apparatus and arcuate shape electrode guides according to one embodiment of the invention.

Since the dressing blade 60 would naturally force the electrode against one side of the guide, in another embodiment the electrode guides 68, 69 do not completely encircle the electrodes. A nearly semi-cylindrical shape open to one side may be adequate for each electrode guide 68, 69. Referring to FIG. 7, in this embodiment the electrodes 16, 18 would simply be inserted into the apparatus by moving them laterally to press against the open electrode guides 68, 69. Once in position, the electrodes 16, 18 would close and come into contact with the rotating dressing blade 60. Lateral forces applied by the dressing blade 60 would insure that the electrodes 16, 18 are held securely in place.

An electrode having an off-center weld face may be desirable in various applications, for example but not limited to, allowing the electrode to weld in a location in which the electrode has very limited access or limited surrounding open volumes for operation or along narrow flanges. Depending on the application, the off-center weld face could be located in various positions depending upon the orientation of the weld gun with respect to the dressing system.

The above description of embodiments of the invention is merely exemplary in nature and, thus, variations thereof are not to be regarded as a departure from the spirit and scope of the invention.

What is claimed is:

1. A product comprising:
an electrode dressing apparatus comprising a rotatable dressing blade comprising at least a first cutting face;
at least one electrode comprising an electrode body and a weld face;
at least one electrode guide comprising a straight guide portion and a tapered guide portion extending from the straight guide portion positioned absolutely relative to the rotatable dressing blade to position the weld face of the electrode at a designated location over the first cutting face; and
bearings on the straight guide portion comprising one of ball bearings or roller bearings.

2. A product as set forth in claim 1 wherein the bearings are spring loaded.

3. A product as set forth in claim 1 wherein the straight guide portion of the electrode guide is tubular and wherein the tapered guide portion is frustoconical.

4. A product as set forth in claim 1 wherein the straight and tapered guide portions of the electrode guide comprise a low-friction surface.

5. A product as set forth in claim 1 further comprising a second cutting face, and a second electrode comprising a second electrode body and a second weld face.

6. A product as set forth in claim 1 wherein the electrode guide fully surrounds the electrode.

7. A product as set forth in claim 1 comprising two electrode guides positioned absolutely relative to the rotatable dressing blade.

8. A product as set forth in claim 7 wherein each of the two electrode guides has a nearly semi-cylindrical shape.

9. A method comprising:
providing an electrode dressing apparatus comprising a rotatable dressing blade comprising at least a first cutting face;
providing a first electrode comprising a first electrode body and a first weld face;
providing an electrode guide comprising a straight guide portion, a tapered guide portion extending from the straight guide portion, and bearings comprising one of ball bearings or roller bearings on the straight guide portion positioned absolutely relative to the rotatable dressing blade; and
positioning the first weld face of the first electrode at a designated location over the first cutting face using the electrode guide.

10. A method as set forth in claim 9 wherein the rotatable dressing blade comprises a second cutting face, and further comprising providing a second electrode comprising a second electrode body and a second weld face over the second cutting face such that the central axis of each of the first and second electrodes are slightly misaligned with respect to each other.

11. A method as set forth in claim 9 further comprising dressing the first weld face comprising rotating the rotatable dressing blade to machine off portions of the first electrode.

12. A method as set forth in claim 9 wherein the first electrode is a resistance spot welding electrode.

13. A method as set forth in claim 9 wherein the straight guide portion of the electrode guide is tubular and wherein the tapered guide portion is frustoconical.

14. A method as set forth in claim 9 wherein the electrode guide fully surrounds the first electrode.

15. A method as set forth in claim 9 wherein the rotatable dressing blade further comprises a second cutting face, and further comprising providing a second electrode comprising a second electrode body and a second weld face;
providing a second electrode guide positioned absolutely relative to the rotatable dressing blade; and
positioning the second weld face of the second electrode at a designated location over the second cutting face relative to the first electrode body using the second electrode guide.

16. A method as set forth in claim 15 further comprising dressing the first and second weld faces comprising rotating the rotatable dressing blade to machine off portions of the first electrode and the second electrode.

17. A method as set forth in claim 15 wherein the electrode guide and the second electrode guide each has a nearly semi-cylindrical shape that partially encircles the first and second electrodes respectively.

* * * * *